United States Patent [19]

Tsukamoto

[11] Patent Number: 5,396,315
[45] Date of Patent: Mar. 7, 1995

[54] ELECTROPHOTOGRAPHIC PRINTING MACHINE

[75] Inventor: Kimihide Tsukamoto, Yamatokoriyama, Japan

[73] Assignee: Sharp Kabushiki Kaisha, Osaka, Japan

[21] Appl. No.: 984,991

[22] Filed: Dec. 2, 1992

[30] Foreign Application Priority Data

Dec. 3, 1991 [JP] Japan ................... 3-319145

[51] Int. Cl.⁶ ............................. G03G 13/02
[52] U.S. Cl. .................. 355/246; 355/208; 355/210; 355/214
[58] Field of Search ............ 355/210, 211, 228, 274, 355/277, 279, 246, 245, 285, 208, 214; 430/42, 54, 66, 902

[56] References Cited

U.S. PATENT DOCUMENTS

| | | | |
|---|---|---|---|
| 3,900,776 | 8/1975 | Lanker | 317/262 A |
| 4,358,520 | 11/1982 | Hirayama | 430/54 |
| 4,365,885 | 12/1982 | Nishikawa | 355/71 |
| 4,403,244 | 9/1983 | Fujishima . | |
| 4,460,668 | 7/1984 | Yoshida et al. | 430/31 |
| 4,468,113 | 8/1984 | Motohashi et al. | 355/311 X |
| 4,591,930 | 6/1986 | Baumeister . | |
| 4,717,999 | 1/1988 | Kaneko . | |
| 4,721,662 | 1/1988 | Haneda | 430/42 |
| 4,797,707 | 1/1989 | Iwahashi et al. | 355/203 X |
| 4,821,065 | 4/1989 | Ishii et al. | 346/108 |
| 4,843,334 | 6/1989 | Ishikawa et al. . | |
| 4,879,577 | 11/1989 | Mabrouk et al. | 355/208 |
| 4,882,257 | 11/1989 | Maruyama et al. | 430/100 |
| 5,034,298 | 7/1991 | Berkes et al. | 430/110 |

FOREIGN PATENT DOCUMENTS

| | | |
|---|---|---|
| 0379212A2 | 7/1990 | European Pat. Off. . |
| 0379212A3 | 7/1990 | European Pat. Off. . |
| 57-119375 | 7/1982 | Japan . |
| 0126366 | 7/1984 | Japan ................... 355/274 |
| 0144676 | 7/1986 | Japan ................... 355/211 |
| 63-185177 | 7/1988 | Japan . |
| 2-218278 | 8/1990 | Japan . |
| 3-043758 | 2/1991 | Japan . |
| 0223779 | 10/1991 | Japan ................... 355/274 |
| 4324463 | 2/1992 | Japan ................... 355/211 |

OTHER PUBLICATIONS

Japanese Publication for examined Patent application No. 4900/ 1990 for opposition (Tokukohei 2-4900).

*Primary Examiner*—Matthew S. Smith
*Assistant Examiner*—Thu Dang
*Attorney, Agent, or Firm*—David G. Conlin; Robert F. O'Connell

[57] ABSTRACT

An electrophotographic printing machine is provided with a photoreceptor whereon a transparent electrically conductive layer and a photoconductive layer are successively formed. A visible image is formed on the photoconductive layer by exposing the photoconductive layer while applying a voltage across toner supplied onto the surface of the photoreceptor and the transparent electrically conductive layer. The exposing energy of the exposure unit is set so as to satisfy an equation:

$$V_L \geqslant V_D - V_{D1},$$

where $V_{D1}$ designates the surface electric potential of the photoreceptor that is exerted when the surface of the photoreceptor, originally having a surface electric potential of virtually zero V, passes by the area in contact with the toner; $V_D$ designates the saturation value of the surface electric potential of the photoreceptor that is attained after the surface of the photoreceptor has successively passed by the area in contact with the toner; and $V_L$ designates a lowered surface electric potential of the photoreceptor that is to be reached by an exposure. Therefore, good picture images without being affected by residual images can be obtained.

30 Claims, 9 Drawing Sheets

ELECTROPHOTOGRAPHIC PRINTING MACHINE

FIELD OF THE INVENTION

The present invention relates to an electrophotographic printing machine which forms a visible image on the surface of a photoreceptor by exposing the surface of the photoreceptor according to an image pattern while charging the surface of the photoreceptor by making a developer holding member, which holds an electrically conductive developer or a dielectric developer, contact the surface of the photoreceptor.

BACKGROUND OF THE INVENTION

Conventionally, in forming images using toner, electrophotography has been generally used, i.e., the application of the Carlson process. The principle of electrophotography is described in detail in reference to FIG. 7 through an example of the normal developing system adopted in photocopying machines. In the photocopying machine which employs the Carlson process, a charger 32, an exposure unit 33, a developer unit 34, a transfer unit 35, a fuser 36, a cleaner 37, and an eraser 38 are provided in this order along the circumference of a photoreceptor drum 31 having a photosensitive layer formed on the surface thereof as shown in FIG. 7.

With this arrangement, first, the surface of the photoreceptor drum 31 is uniformly charged by a charger 32 in a dark place. Next, an original image is illuminated on the surface of the photoreceptor drum 31 by the exposure unit 33 so as to remove charges from the illuminated portion, thereby forming an electrostatic latent image on the surface of the photoreceptor drum 31. Thereafter, toner 39 is made to adhere to the electrostatic latent image, the toner 39 being charged by applying thereon a charge with a polarity opposite to the charge on the photoreceptor drum 31 in the developer unit 34, thereby forming a visible image with the toner 39.

Further, a copying material 40 is superimposed on the visible image. Then, a corona-discharging is carried out by the transfer unit 35 from the back surface of the copying material 40 so as to apply a charge with a polarity opposite to the toner 39. As a result, the visible image is transferred onto the copying material 40. Then, using heat and pressure from the fuser 36, the transferred visible image is made permanent on the copying material 40. Any residual toner 39a remaining on the photoreceptor drum 31 after the transfer are removed by a cleaner 37. After eliminating the charge from the electrostatic latent image on the photoreceptor drum 31 by projecting thereon a light beam from the eraser 38, the process starting with the charging process by the charger 32 is repeated, thereby successively forming images.

In the discussed electrophotography wherein the Carlson process is applied, normally a corona discharger is adopted for charging the photoreceptor drum 31 or transferring the toner 39 to the copying material 40. However, when the corona discharger is adopted, the application of high voltage of several kV is required. Moreover, it is likely to be affected by a change in the ambient condition, for example, a change in the charge amount on the surface of the photoreceptor drum 31 due to a temperature change. Furthermore, ozone produced in the process of corona discharging results in problems concerning environmental health.

In order to counteract the above-mentioned problems, an image forming process has been developed, one that does not require the corona charging. This process is disclosed in Japanese Examined Patent Publication 4900/1990 (Tokukouhei 2-4900). When adopting this method, as shown in FIG. 8, a photoreceptor 50 is desirably arranged such that a transparent electrically conductive layer 52 made of $In_2O_3$, etc., a photoconductive layer 53 made of Se etc., and a dielectric layer 54 made of polyethylene terephtalate film are laminated in this order on a transparent base 51 made of glass or the like.

In this arrangement, first a magnet 56 as a toner holder with electrically conductive and magnetic toner 55 adhering thereto is brought close to the surface of the photoreceptor 50 and voltage is then applied across the magnet 56 and the transparent electrically conductive layer 52. In this state, when exposure is conducted onto the surface of the photoreceptor 50 from the side of the transparent base 51, the electric resistance of the surface of the photoconductive layer 53 is lowered at the illuminated portion; thus, a charge is injected under the dielectric layer 54. Accordingly, a strong electric field is exerted between the magnet 56 and the photoreceptor 50 in such a manner that a charge with the polarity opposite to that of the charge injected under the dielectric layer 54 is injected to the toner 55 located in the exposed portion.

As a result, by making pairs with the charges of the opposite polarities, the charged toner 55 and the charge injected under the dielectric layer 54 through the transparent electrically conductive layer 52 become attracted to one another with the dielectric layer 54 situated in between. In this way, even after the magnet 56 has been moved away from the photoreceptor 50, the toner 55 at the exposed portion remain on the surface of the photoreceptor 50.

As described, the discussed method enables a visible image to be formed on the surface of the photoreceptor 50 without using the corona charging. After the visible image is formed on the surface of the photoreceptor 50, the visible image is transferred from the surface of the photoreceptor 50 to the surface of the copying material as in the case of the Carlson process. Thereafter, the copying material is transported to the fuser, where the toner is melted and fixed thereon by heat treatment; thus, the visible image is permanently affixed to the copying material.

However, in the case as described above, where the surface of the photoreceptor is charged by the electrically conductive and magnetic toner 55, the charged state of the surface of the photoreceptor is easily affected by those factors such as: electric resistance value of the electrically conductive toner 55 or the magnet 56; charge-holding characteristic of the surface of the photoreceptor 50; distance and potential difference between the electrically conductive and magnetic toner 55 or the magnet 56 and the photoreceptor 50; and contact area and relative speed between the toner 55 and the photoreceptor 50.

For example, the following description will discuss an experiment and its results, which was conducted about the charge of the surface of a photoreceptor. A photoreceptor, which measures 30 mm in outer diameter, is provided with a transparent base and a photoconductive layer made of amorphous Si having a thickness of 3 $\mu$m and a transparent electrically conductive layer, both formed on the transparent base in this order from the surface side. Here, no dielectric layer is formed on the surface of the photoreceptor. In the state where a toner holder with electrically conductive and magnetic toner ($1 \times 10^7$ Ωcm) adhering thereto is in contact with the surface of the photoreceptor, a voltage of 20 V, designated by $V_S$, is applied across the toner holder and the transparent electrically conductive layer of the photoreceptor while the photoreceptor is being rotated at a peripheral speed of 30 mm/s. If the surface electric potential of the photoreceptor before passing by the area in contact with the electrically conductive and magnetic toner is virtually zero, the electric potential of a particular portion of the photoreceptor is increased every time it passes by the area in contact with the electrically conductive and magnetic toner, as is shown in FIG. 9. In FIG. 9, $V_{D1}$ represents the surface electric potential of the photoreceptor after passing by the area in contact with the electrically conductive and magnetic toner once; $V_{D2}$ represents that after passing by the contact area twice; and $V_D$ represents the saturation value of the surface electric potential of the photoreceptor.

In this arrangement, the surface electric potential of the photoreceptor is merely increased to approximately 60 to 80 percents of the voltage $V_s$ that has been applied to the toner holder, after passing by once the area in contact with the electrically conductive and magnetic toner. After passing by the area in contact with the electrically conductive and magnetic toner three times, the surface electric potential is increased to the vicinity of the saturation value $V_D$.

For this reason, as shown in FIG. 10, when the surface electric potential of the photoreceptor is lowered to a residual electric potential, designated by $V_R$, during exposure, the potential difference of a surface portion of the photoreceptor subjected to the lowering is merely increased up to $V_{DR}$ after the portion in question has passed by the area in contact with the electrically conductive and magnetic toner once in the following developing process. Therefore, there exists a gap between the saturation value $V_D$ of the surface electric potential of the photoreceptor and the surface electric potential $V_{DR}$ of the photoreceptor after passing by the area in contact with the electrically conductive toner. This results in an electric field between the toner holder and the surface of the photoreceptor; therefore, the toner adheres to the surface of the photoreceptor even at a non-image portion that has not been subjected to the exposure. Thus, a problem is presented in that an image pattern that was formed in the exposing process of the previous rotation may be developed in the following rotation, resulting in a residual image.

SUMMARY OF THE INVENTION

It is an object of the present invention to provide an electrophotographic printing machine wherein the corona charging is not required and high-quality images can be obtained by restricting the occurrence of residual images.

In order to achieve the above objective, the electrophotographic printing machine of the present invention is provided with: photoreceptor means having a photoconductive layer formed thereon, the photoconductive layer being moved in relation to charging develop means; charging develop means for charging a surface of the photoreceptor means by applying a voltage thereto and for conducting a developing process by supplying a developer onto the surface of the photoreceptor means; and exposure means for exposing the photoconductive layer in such a manner that a surface voltage of the photoreceptor means is lowered. Further, the electrophotographic printing machine is characterized in that the exposure means is set in such a manner that an exposing energy thereof is represented by an equation:

$$V_L \geqslant V_D - V_{D1},$$

where $V_{D1}$ designates the surface electric potential of the photoreceptor means that is exerted when the surface of the photoreceptor means, originally having a surface electric potential of virtually zero V, passes by the charging develop means; $V_D$ designates the saturation value of the surface electric potential of the photoreceptor means that is attained after the surface of the photoreceptor means has successively passed by the charging develop means; and $V_L$ designates the lowered surface electric potential of the photoreceptor means that is to be reached by an exposure.

With the above arrangement, the charging develop means charges the surface of the photoreceptor means by applying a voltage thereonto. Therefore, it is not necessary to provide a charger such as a corona discharger which produces unwanted ozone during the charging process.

Further, the above electrophotographic printing machine is designed in such a manner that exposure is conducted according to an image pattern after setting the exposing energy of the exposure means to satisfy the requirements of the above equation while uniformly charging the surface of the photoreceptor means by using the charging develop means. Consequently, the surface electric potential of the photoreceptor means is lowered to $V_L$ at the exposed portion, and an electrostatic latent image is thus formed on the surface of the photoreceptor means. Then, developer is supplied onto the surface of the photoreceptor means by the charging develop means, and the developer adheres to the electrostatic latent image to form a visible image on the surface of the photoreceptor means. Here, in the above electrophotographic printing machine, each of the charging, exposing and developing processes are almost simultaneously executed when the surface of the photoreceptor means passes by the charging develop means.

In addition, the visible image thus formed on the surface of the photoreceptor means is transferred onto a copying material directly or through an intermediate transfer member, and affixed thereto, and the visual image becomes permanent on the copying material through a fixing process.

In the case where image forming processes are successively performed through a mechanism wherein the surface of the photoreceptor means is again permitted to pass by the charging develop means after the visible image formed on the surface of the photoreceptor means has been transferred onto another member (such as the above-mentioned copying material or the intermediate transfer member), the mechanism is more specifically explained as follows: The surface electric potential $V_L$ of the photoreceptor, which has been lowered by the previous exposure, is increased to the vicinity of the saturation value $V_D$ of the surface electric potential of the photoreceptor through the charge applied by the charging develop means during the following exposure. For this reason, the electrostatic latent image derived from the previous image pattern hardly remains at a non-image portion of the surface of the photoreceptor means. Therefore, good images without being affected by residual images can be obtained in the above-mentioned electrophotographic printing machine.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a graph showing the change of the surface electric potential of a photoreceptor drum upon receiving charge and exposure.

FIG. 2 is a vertical sectional view showing a configuration of an electrophotographic printing machine including a photoreceptor drum, a developer unit, an exposure unit and a dielectric belt.

FIG. 3 is a schematic view showing various components that constitute an electrophotographic printing machine.

FIG. 4 is an explanatory view showing the state when the surface of the photoreceptor drum is charged through the contact with electrically conductive toner.

FIG. 5 is an explanatory view showing the state when the surface of the photoreceptor drum is neutralized by being exposed by the exposure unit.

FIG. 6 is an explanatory view showing the state when a visible image is formed on the surface of the photoreceptor drum.

FIG. 7 is a typical depiction showing a configuration of an image forming apparatus adopting the conventional Carlson process.

FIG. 8 is a typical depiction of a cross-sectional view showing essential parts of an image forming apparatus wherein a conventional image forming process using electrically conductive toner.

FIG. 9 is a graph showing the change of the surface electric potential of the photoreceptor drum that is charged through the contact with the electrically conductive toner.

FIG. 10 is a graph showing the change of the surface electric potential of the photoreceptor drum when the drum, which has been once exposed, again comes into contact with the electrically conductive toner.

DETAILED DESCRIPTION OF THE EMBODIMENTS

Referring to FIGS. 1 through 6, a first embodiment illustrating the present invention will be discussed hereinbelow.

Figure 2:
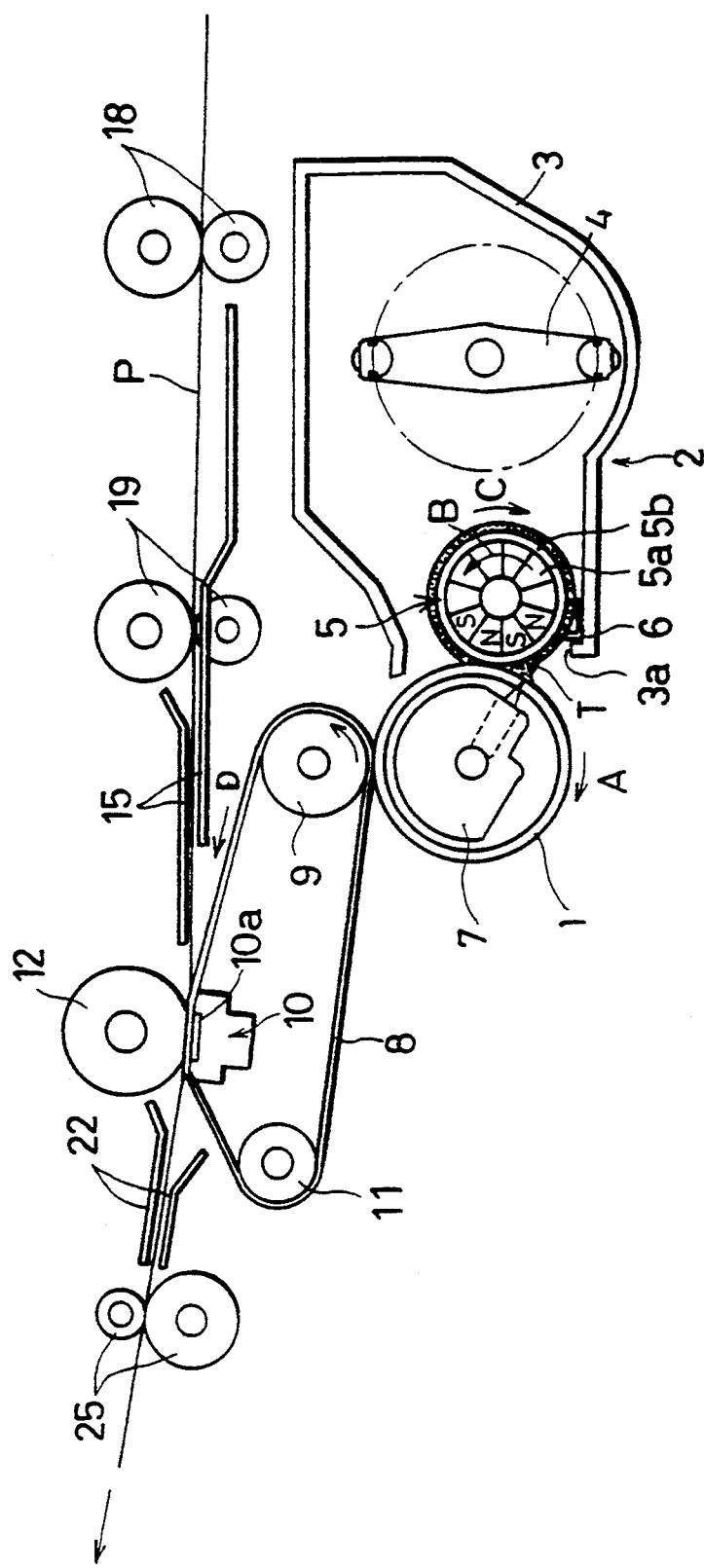

As shown in FIG. 2, an electrophotographic printing machine in accordance with the present embodiment is provided with a cylindrical photoreceptor drum 1 (photoreceptor means) that is rotatable within the apparatus in the direction of arrow A. In FIG. 2, a developer unit 2 (charging develop means) is located on the right side of the photoreceptor drum 1 in which an exposure unit 7 (exposure means) is provided. Furthermore, a dielectric belt 8 (moving means) in contact with a photoconductive layer 1c of the photoreceptor drum 1 is provided above the photoreceptor drum 1, which moves in the direction of arrow D at the same speed as the peripheral speed of the photoreceptor drum 1.

Figure 4:
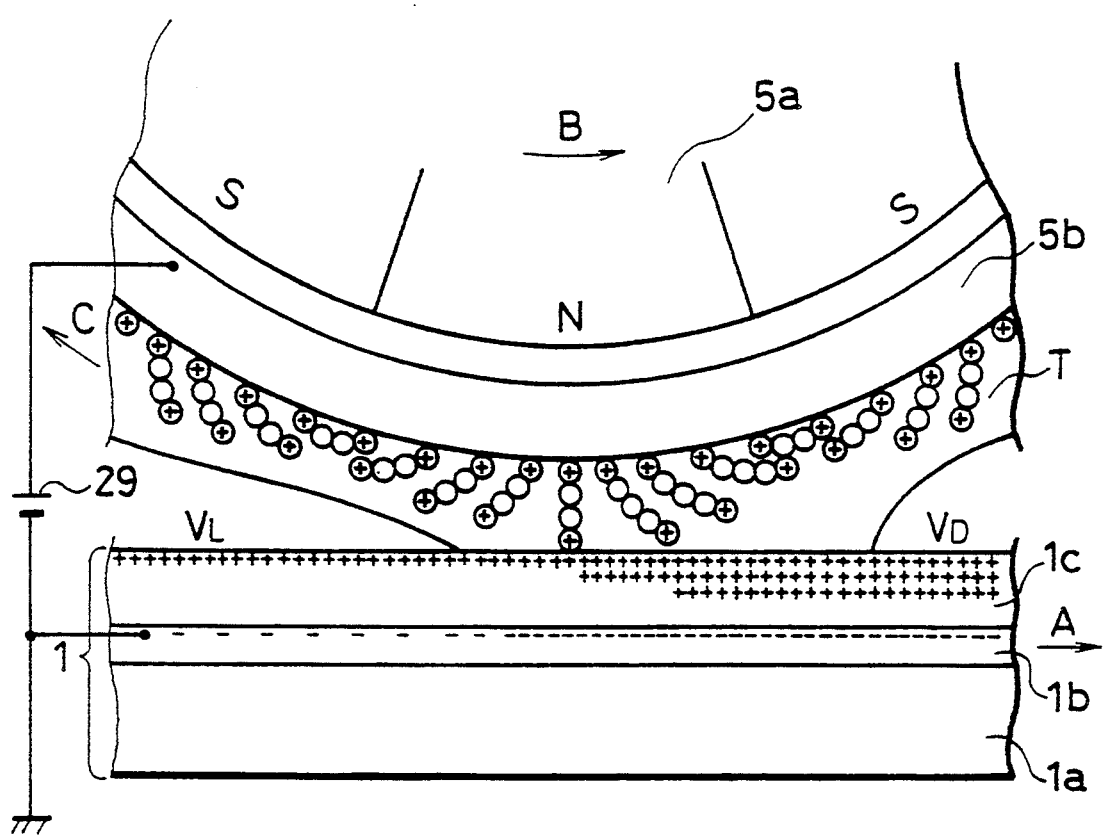

As shown in FIG. 4, the photoreceptor drum 1 is provided with a transparent cylindrical base 1a having a transparent electrically conductive layer 1b (base) and a photoconductive layer 1c made of photoconductive material laminated in this order on the surface thereof. In the present embodiment, for the transparent electrically conductive layer 1ba In$_2$O$_3$ layer with a thickness of substantially 0.5 $\mu$m is formed by sputtering In$_2$O$_3$. For the photoconductive layer 1c, an amorphous Si layer with a thickness of substantially 3 $\mu$m is formed. However, the transparent electrically conductive layer 1b is not limited to the In$_2$O$_3$ layer. Other than the In$_2$O$_3$ layer, for example, a SnO$_2$ layer may be preferably used. Similarly, the photoconductive layer 1c is not limited to the amorphous Si layer; other types of layer, for example, a Se layer, a ZnO layer or a CdS layer may be preferably used.

As shown in FIG. 2, the developer unit 2 includes a developer vessel 3 for storing an electrically conductive toner T as a developer; a mixing roller 4 for mixing the electrically conductive toner T, the mixing roller 4 being rotatively provided in the developer vessel 3; a toner holder 5 placed in an opening 3a of the developer vessel 3 so as to confront the photoreceptor drum 1 and a doctor blade 6 fixed to a position under the toner holder 5 in the opening 3a of the developer vessel 3.

The toner holder 5 which extends in an axis direction of the photoreceptor drum 1 includes: a magnetic roller 5a which has N polarity magnets and S polarity magnets that are alternately disposed in a circumferential direction; and a developer sleeve 5b which surrounds the periphery surface of the magnetic roller 5a. The developer sleeve 5b is made of a non-magnetic material such as aluminum or martensite series stainless steel. The toner holder 5 is arranged as follows. First, an alternating field is generated when the magnetic roller 5a rotates in the direction of arrow B, then the toner holder 5 holds the electrically conductive toner T on the surface of a developer sleeve 5b and transports the electrically conductive toner T in the direction of arrow C that is opposite to the rotating direction B of the magnetic roller 5a. Then, the amount of the electrically conductive toner T on the surface of the developer sleeve 5b that has been transported in the direction of arrow C is adjusted to a predetermined amount by the doctor blade 6.

The electrically conductive toner T is produced by the following way. Powdered magnetic material such as powdered iron or ferrite and carbon black is mixed into a resin made of styrene-acrylic copolymer by kneading. The mixture is ground into particles ranging from several $\mu$m to several tens $\mu$m, in order to obtain the electrically conductive toner T.

The exposure unit 7 is arranged so as to include a light emitting diode (LED) array wherein a plurality of lens having a short focal distance and LEDs are combined. The exposure unit 7 projects a light beam in response to an exposure pattern signal from an exposure controlling unit (not shown) towards the developer unit 2 so that the light beam is converged onto the photoconductive layer 1c through the transparent base 1a and the transparent electrically conductive layer 1b of the photoreceptor drum 1.

In the above exposure unit 7, when V$_{D1}$ designates the surface electric potential of the photoreceptor drum 1 that is exerted when the surface of the photoreceptor drum 1, originally having a surface electric potential of virtually zero V, passes by the area in contact with the electrically conductive and magnetic toner T; $V_D$ designates the saturation value of the surface electric potential of the photoreceptor drum 1 that is attained after the surface of the photoreceptor drum 1 has successively passed by the area in contact with the above developing powder; and $V_L$ designates the lowered surface electric potential of the photoreceptor drum 1 that is to be reached by an exposure, the exposing energy is set to satisfy an equation:

$$V_L > V_D - V_{D1} \qquad (1).$$

More specifically, the exposing energy is controlled in such a manner that the surface electric potential of the photoreceptor drum 1, which has been lowered by the previous exposure, is increased to the vicinity of the saturation value $V_D$ by permitting the photoreceptor drum 1 to pass by the area in contact with the electrically conductive and magnetic toner T through the following developing process; thus, the surface electric potential $V_L$ of the photoreceptor drum 1 after exposure is determined.

The dielectric belt 8, which is an endless belt, is made of film material including mainly polyimide which is superior in its mechanical strength and heat resistance. The dielectric belt 8 goes around a transfer roller 9 (transfer means), made of an electrically conductive elastic member, which is disposed above the photoreceptor drum 1, and a heater 10 (melt transfer fixing means and heating means), to be described later, placed on the left side and slightly upper side of the transfer roller 9 and a tension roller 11 located on the left side and slightly lower side of the heater 10 in the figure. The dielectric belt 8 is set between the photoreceptor drum 1 and the transfer roller 9.

For the dielectric belt 8, a film-shaped polyimide resin is used in the present embodiment. However, the present invention is not intended to be limited to this material, and other material may be used as long as the surface on which the electrically conductive toner T is transferred (i.e., the surface in contact with the photoreceptor drum 1) is dielectric. The dielectric belt 8 may be made of the polyimide resin or, for example, the dielectric belt 8 could be made of a metal belt having a dielectric layer formed on the surface in contact with the photoreceptor drum 1. Here, an electric cast nickel belt is preferably used for the metal belt, and the dielectric layer is preferably formed by coating the surface of the metal belt with fluorine contained resin. Although, it is not necessary to specify the thickness of the dielectric belt 8, considering its thermal conductivity and mechanical strength, thickness of substantially 10 μm to 200 μm is preferable. In addition, for the purpose of making the gloss of the image appropriate, the surface of the dielectric belt 8 may be rough.

As will be described later, the heater 10 is provided for melting the electrically conductive toner T by heat treatment, that to be transferred to the surface of the dielectric belt 8. The heater 10 is designed to be a ceramic heater having a plane-shaped Mo series electric resistance heater 10a (plane-shaped electric heating element) and a glass coat laminated on an alumina ceramic substrate in this order by printing. Further, the heater 10 is arranged such that the temperature of the heating surface thereof is rapidly raised up to a predetermined heating temperature by conducting through the electric resistance heater 10a. The heating surface is in direct contact with the surface of the dielectric belt 8.

A pressing roller 12 (melt transfer fixing means and pressing means) is provided above the heater 10, which rotates in the direction towards the heater 10 while pressing force is being exerted through the dielectric belt 8. The pressing roller 12 is arranged so as to press a transfer sheet P (copying material) towards the dielectric belt 8 whereon the transfer sheet P is being transported by a copying material transport means 14, which will be described later.

Figure 3:
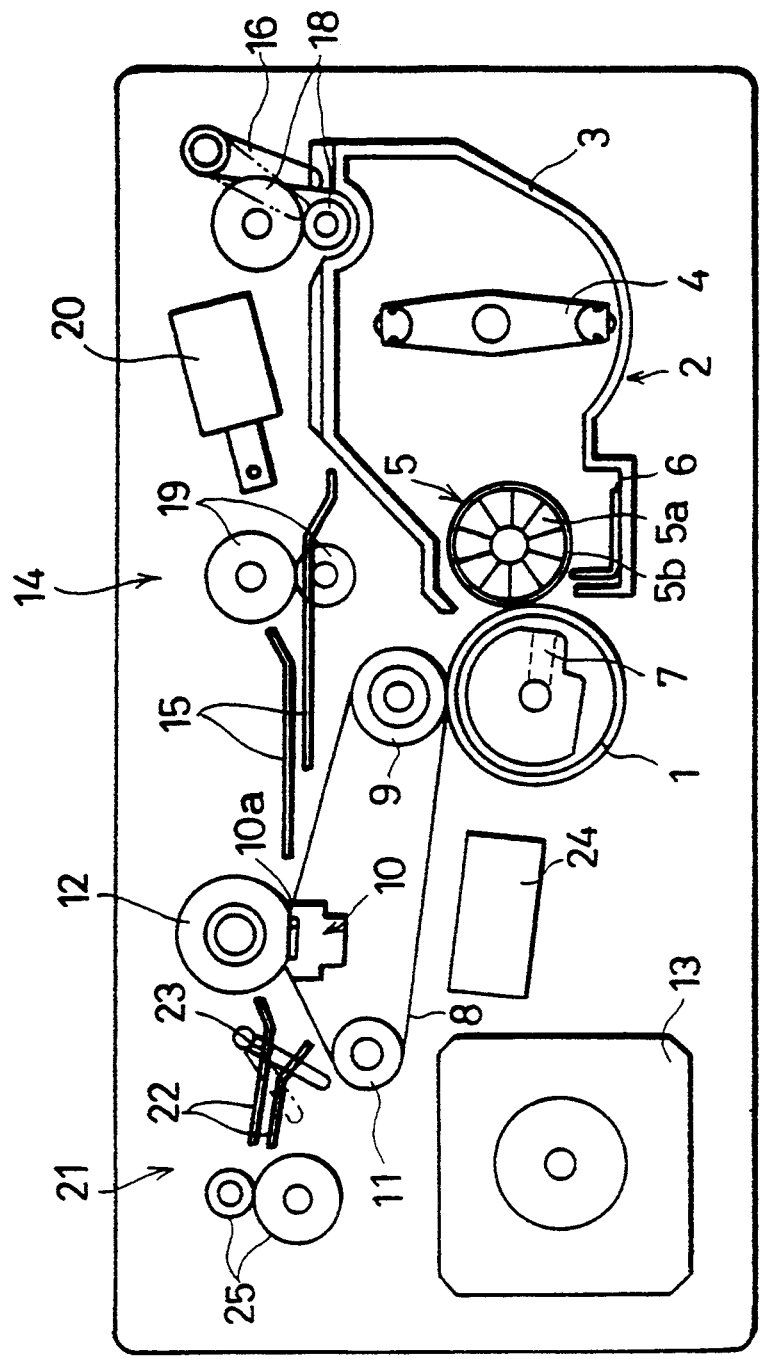

As illustrated in FIG. 3, the electrophotographic printing machine is provided with a cooling fan 24 for cooling off the dielectric belt 8 from below, a main motor 13 serving as a source of driving force of the apparatus, the aforementioned copying material transport means 14 for transporting the transfer sheet P to the pressure section between the dielectric belt 8 and the pressing roller 12, and a paper discharging means 21 for discharging the transfer sheet P out of the apparatus.

The copying material transport means 14 is disposed above the photoreceptor drum 1, the developer unit 2 and the dielectric belt 8. The copying material transport means 14 is provided, as its components, with a transport guide plate 15, which forms a transport path connecting a transfer sheet feed opening, not shown, to the pressure section between the dielectric belt 8 and the pressing roller 12; a feed-detection actuator 16 and a feed roller 18, which are disposed in the proximity of the transfer sheet feed opening; a register roller 19 disposed in the middle of the transport path formed by the transport guide plate 15; and a paper feed solenoid 20 for controlling the rotation of the register roller 19.

The above-mentioned paper discharging means 21 is disposed on the left side of the pressure section between the dielectric belt 8 and the pressure roller 12. The paper discharging means 21 is provided, as its components, with a discharge guide plate 22, which forms a discharge path connecting the pressure section between the dielectric belt 8 and the pressing roller 12 to the transfer sheet feed opening, not shown; a discharge-detection actuator 23 disposed in the proximity of the pressure section between the dielectric belt 8 and the pressing roller 12; a pair of transport rollers 25 disposed at the end of the discharge guide plate 22.

An operating procedure of the discussed electrophotographic printing machine will be described hereinbelow.

First, a piece of transfer sheet P is fed into the apparatus by the transfer sheet supply means (not shown) through the transfer sheet feed opening section. Here, as the leading edge of the transfer sheet P pushes up the feed-detection actuator 16, a feed detection switch (not shown) detects that the transfer sheet P is fed, and a feed detection signal is sent to the main motor 13 which serves as a drive source. Thus, upon receiving the feed detection signal, the main motor 13 starts rotating.

Next, the rotation of the main motor 13 is transmitted to the feed roller 18 through a rotation transmission mechanism (not shown), thereby rotating the feed roller 18. With the rotation of the feed roller 18, the transfer sheet P is transported to the register roller 19.

The transfer sheet P that has been transported to the register roller 19 is temporarily stopped as the register roller 19 stops rotating under control of the paper feed solenoid 20. In this state, a pair of the feed rollers 18 sandwich the transfer sheet P. Here, since the frictional resistance of the surfaces of the rollers 18 is very small, the feed rollers 18 slip on both surfaces of the transfer sheet P when the transfer sheet P is stopped from being transported.

Here, the electrophotographic printing apparatus enters the stand-by state, and if a printing start signal is not inputted thereto within a predetermined period, the main motor 13 will be stopped. On the other hand, if the printing start signal is inputted thereto during the stand-by state, all the rotation sections except the register roller 19 will start rotating due to the rotation transmission mechanism (not shown).

Figure 5:
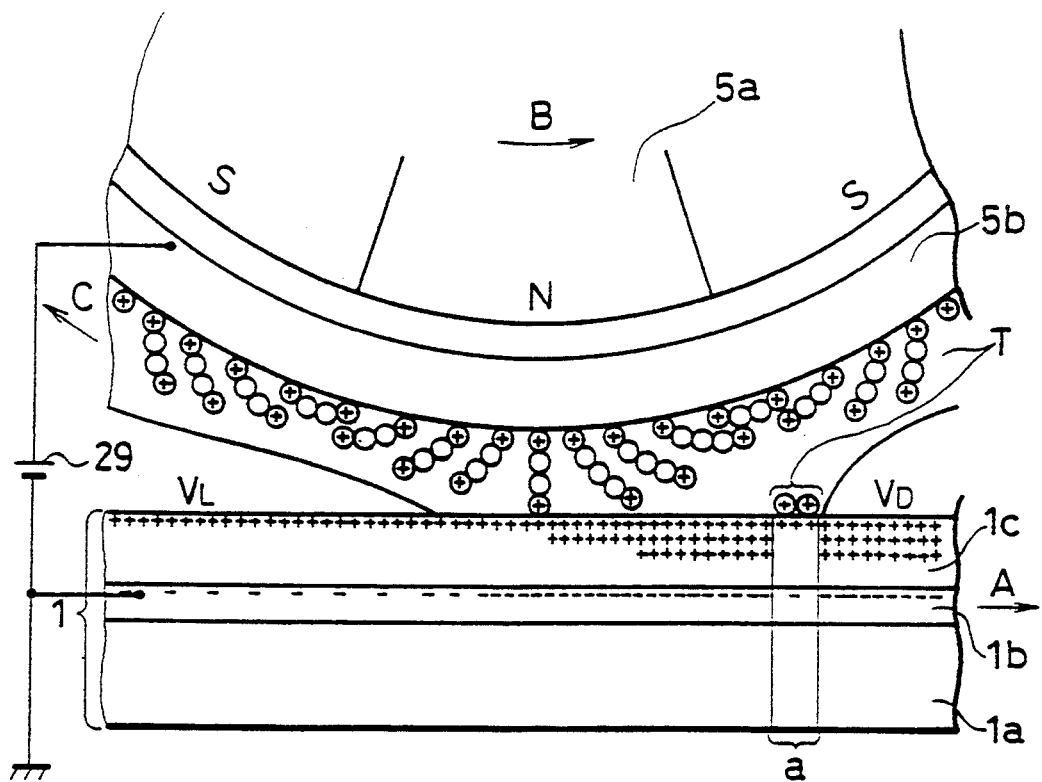

The developing process of the electrically conductive and magnetic toner T is described hereinbelow with reference to FIGS. 4 to 6.

First, as shown in FIG. 4, the electrically conductive toner T stored in the developer vessel 3 is held on the surface of the developer sleeve 5b by an alternating magnetic field generated when the magnetic roller 5a rotates in the direction of arrow B (see FIG. 2); in the mean time, the electrically conductive toner T is transported on the surface of the developer sleeve 5b in the direction of arrow C, i.e., a direction opposite to the rotating direction A of the photoreceptor drum 1.

The surface of the photoreceptor drum 1 is charged before contacting the electrically conductive toner T such that its surface electric potential has reached $V_L$ or more. When a voltage of, for example, 20 V is applied across the developer sleeve 5b and the transparent electrically conductive layer 1b by a power supply 29 (voltage application means), the charge is injected into the surface of the photoreceptor drum 1 within the contacting area between the electrically conductive toner T and the photoreceptor drum 1, from the developer sleeve 5b through the electrically conductive toner T; thus, the surface of the photoreceptor drum 1 is charged so as to have virtually the same electric potential as the saturation value $V_D$ of the surface electric potential of the photoreceptor (see FIG. 1).

When the surface of the photoreceptor is charged to have virtually the same electric potential as the saturation value $V_D$, the potential difference between the surface of the photoreceptor drum 1 and the developer sleeve 5b becomes smaller in such a manner that no charge is injected to the electrically conductive toner T. Therefore, the electrically conductive toner T is attracted to the developer sleeve 5b side by a magnetic force that is generated by the magnetic roller 5a; this prevents the electrically conductive toner T from adhering to the surface of the photoreceptor drum 1.

Figure 1:
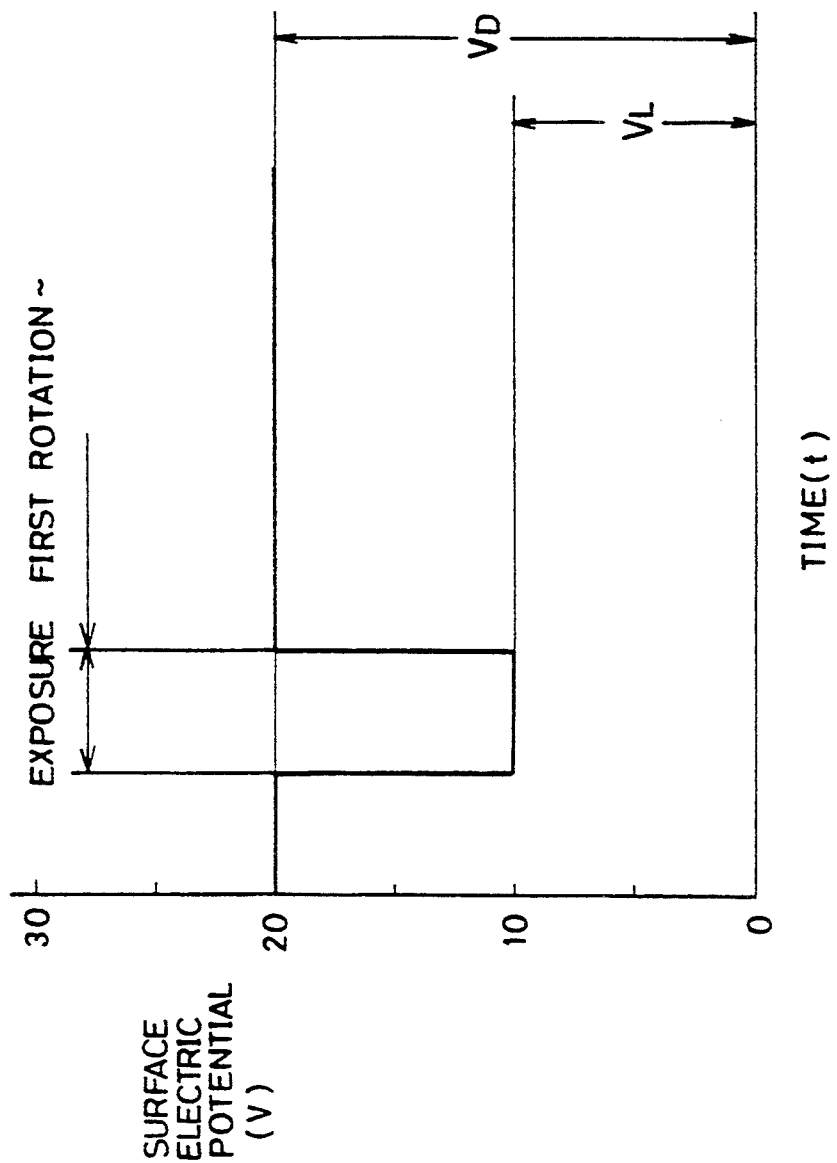
FIGS. 1 through 6 show one embodiment of the present invention.

Under the above state, an exposing process is carried out by the exposure unit 7. More specifically, as shown in FIG. 5, in the exposure unit 7, the LED corresponding to the image pattern is successively selected in order, and a light is projected by the exposure unit 7 onto an area a where the photoreceptor drum 1 is about to depart from the electrically conductive toner T. At this time, in the photoconductive layer 1c on the surface of the photoreceptor drum 1 corresponding to the exposed portion a, free carriers are generated by an electronic excitation due to the light absorption. These free carriers neutralize the electric charge that has been injected into the surface of the photoreceptor drum 1 through the action of an electric field that is exerted within the photoconductive layer 1c when the drum 1 comes into contact with the electrically conductive toner T. Thus, as shown in FIG. 1, the electric potential of the exposed area a on the surface of the photoreceptor drum 1 is lowered to $V_L$.

In this manner, the electric potential of the surface of the photoreceptor drum 1 is lowered, and when a sufficient potential difference arises between the surface of the photoreceptor drum 1 and the developer sleeve 5b, a positive charge is injected into the electrically conductive toner T that is in contact with the area a on the surface of the photoreceptor drum 1. Accordingly, the electrically conductive toner T adheres to the area a on the surface of the photoreceptor drum 1 that has been subjected to the lowering of the electric potential. Then, a charge injection is about to take place again on the area a on the photoconductive layer 1c that has been subjected to the lowering of the electric potential through the adhering electrically conductive toner T.

Figure 6:
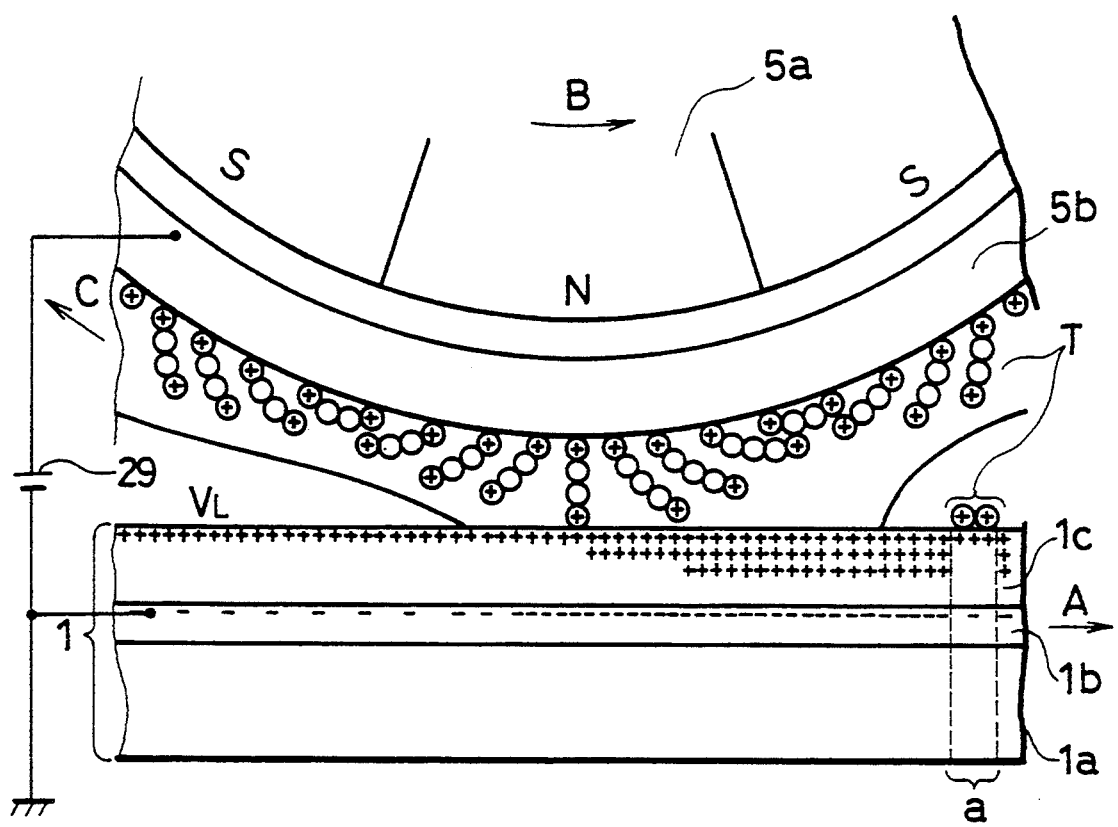
Figure 7:
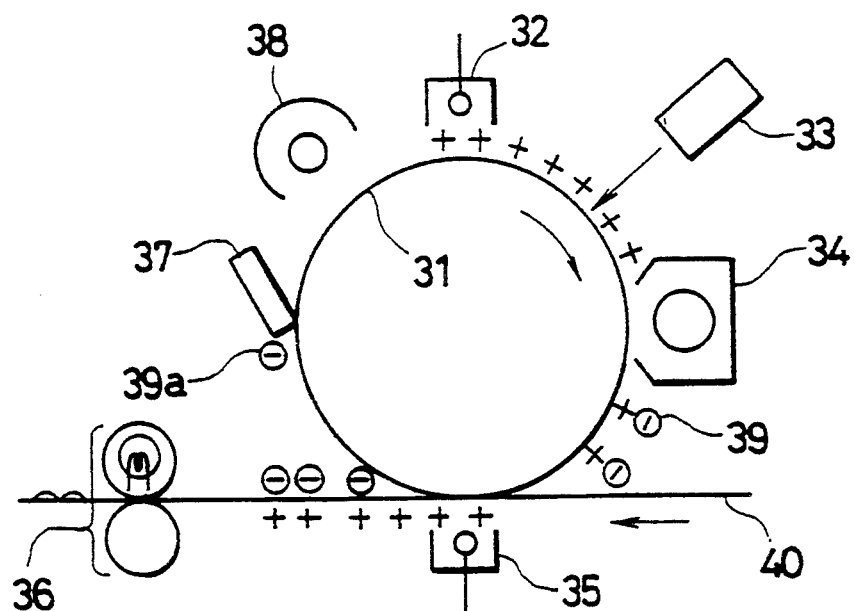
FIGS. 7 through 10 show the prior art.

However, as shown in FIG. 6, since the photoreceptor drum 1 is moving in the direction indicated by arrow A, the area a on the surface of the photoconductive layer 1c is separated from the area in contact with the electrically conductive toner T in the course of the charge injection from the electrically conductive toner T into the photoconductive layer 1c. At this time, the electrically conductive toner T, which adheres to the area a on the surface of the photoreceptor drum 1, is maintained, as it is, on the surface of the photoreceptor drum 1, because its adhering force to the surface of the photoreceptor drum 1 exceeds a magnetic force of the magnetic roller 5a. (Here, the adhering force refers to a compound force consisting of a Coulomb force due to an electric field exerted between the developer sleeve 5b and the surface of the photoreceptor drum 1, van der Waals forces exerted between the surface of the photoreceptor drum 1 and the electrically conductive toner T, and other forces). As a result, a visible image corresponding to the image pattern is formed on the surface of the photoreceptor drum 1.

In this case, during the exposing process, the exposing energy of the exposure unit 7 is set to satisfy the aforementioned equation (1). Therefore, the surface electric potential at the exposed area of the photoreceptor drum 1, which has been lowered to $V_L$ after exposure, is increased to the vicinity of the saturation value $V_D$ of the surface electric potential of the photoreceptor drum 1 while the area in question passes by the area in contact with the electrically conductive toner T in the following developing process.

As shown in FIG. 2, the photoreceptor drum 1 rotating in A direction transports the visible image thus formed on the surface of the photoreceptor drum 1 to the pressure section, where the dielectric belt 8 is pressed between the photoreceptor drum 1 and the transfer roller 9. Then, voltage with a polarity opposite to the injected electric charge of the visible image is applied to the transfer roller 9. As a result, the visible image on the surface of the photoreceptor drum 1 is transferred onto the surface of the dielectric belt 8 that is moving at the same speed as the peripheral speed of the photoreceptor drum 1. Thereafter, the visible image that has been transferred onto the surface of the dielectric belt 8 is transported to the pressure section between the dielectric belt 8 and the pressing roller 12 by the dielectric belt 8 that is moving in the direction of arrow D.

Further, the CPU (Central Processing Unit) of the engine controller (not shown) sends out a signal to the paper feed solenoid 20 of FIG. 3 so that the visible image on the surface of the dielectric belt 8 properly coincides with the transfer sheet P at the pressure section between the dielectric belt 8 and the pressing roller 12. Then, the register roller 19 is released from the stop state of rotation, thereby transporting the transport sheet P to the pressure section between the dielectric belt 8 and the pressing roller 12.

The transfer sheet P, which has been superimposed onto the transferred visible image on the dielectric belt 8, is transported through the heater 10 and the pressing roller 12. During this process, the transfer and fixing processes of the visible image to the transfer sheet P are carried out simultaneously. That is, when the transfer sheet P is transported while being pressed between the dielectric belt 8 and the pressing roller 12, the electrically conductive toner T on the surface of the dielectric belt 8 is melted by heat treatment of the heater 10. In this case, the melted electrically conductive toner T is separated from the surface of the dielectric belt 8 more easily than from the surface of the transfer sheet P. Therefore, almost all the electrically conductive toner T can be transferred and permanently affixed to the transfer sheet P without any toner remaining on the dielectric belt 8.

Thereafter, the transfer sheet P, whereon the visible image is transferred and permanently affixed thereto, pushes up the discharge detection actuator 23 and discharged from the apparatus through the transfer sheet discharge opening with rotations of the transport roller 25. Then, after a predetermined elapse of time, the power source to the heat resistor 10a of the heater 10 is turned off and the driving of the main motor 13 is stopped, thereby completing the above sequential process.

As described, in the electrophotographic printing machine of the present embodiment, the surface of the photoreceptor drum 1 is charged until its surface electric potential reaches the saturation value, by permitting the electrically conductive toner T held by the developer sleeve 5b to contact the photoreceptor drum 1 while applying voltage of the power supply 29 across the developer sleeve 5b and the transparent electrically conductive layer 1b of the photoreceptor drum 1. Then, the exposure unit 7 exposes the area in contact with the electrically conductive toner T of the photoreceptor drum 1 from inside thereof; thus, the visible image corresponding to the image pattern is formed on the surface of the photoreceptor drum 1. In particular, in the electrophotographic printing machine of the present embodiment, the exposing energy of the exposure unit 7 is determined in such a manner that the surface electric potential of the photoreceptor drum 1, which has been lowered to $V_L$ by the previous exposure, is increased to the vicinity of the saturation value $V_D$ by permitting the photoreceptor drum 1 to pass by the contact area to the electrically conductive and magnetic toner T once.

Therefore, in the non-image portion, since the surface electric potential of the photoreceptor 1 is maintained at the vicinity of the saturation value $V_D$, the electric potential of the developer sleeve 5b and the surface electric potential of the photoreceptor drum 1 become virtually the same value; consequently, no charge is injected to the electrically conductive toner T, thereby reducing the occurrence of fogging in copied images.

Moreover, since the exposing energy is determined as described above, the surface electric potential $V_L$ of the photoreceptor drum 1 after exposure is increased to the vicinity of the saturation value $V_D$ by permitting the photoreceptor drum 1 to pass by the area in contact with the electrically conductive and magnetic toner T during the following developing process; consequently, a drawback that a remaining image derived from the previous developing process appears in the following developing process is eliminated, thereby providing good images without being affected by residual images.

Furthermore, since no charger for charging the surface of the photoreceptor drum 1, such as a corona discharger, is required, the possibility of producing ozone during the charging process is eliminated. Since the exposure unit 7 is installed inside the photoreceptor drum 1, it is possible to make the entire structure of the apparatus compact.

Figure 8:
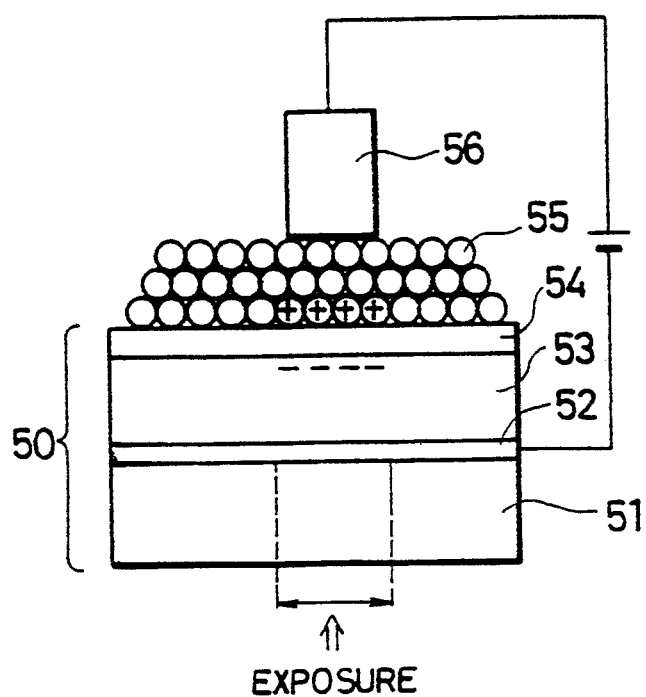
Figure 9:
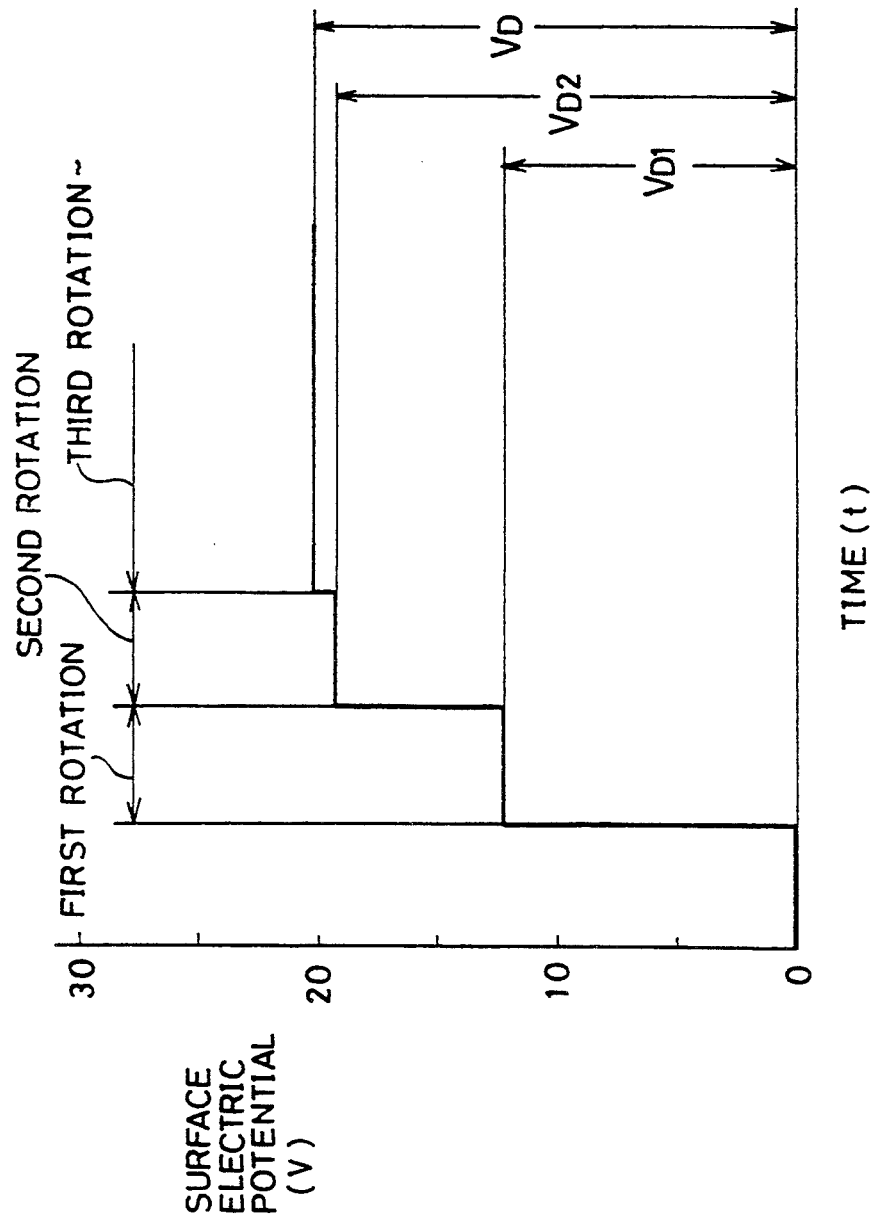
Figure 10:
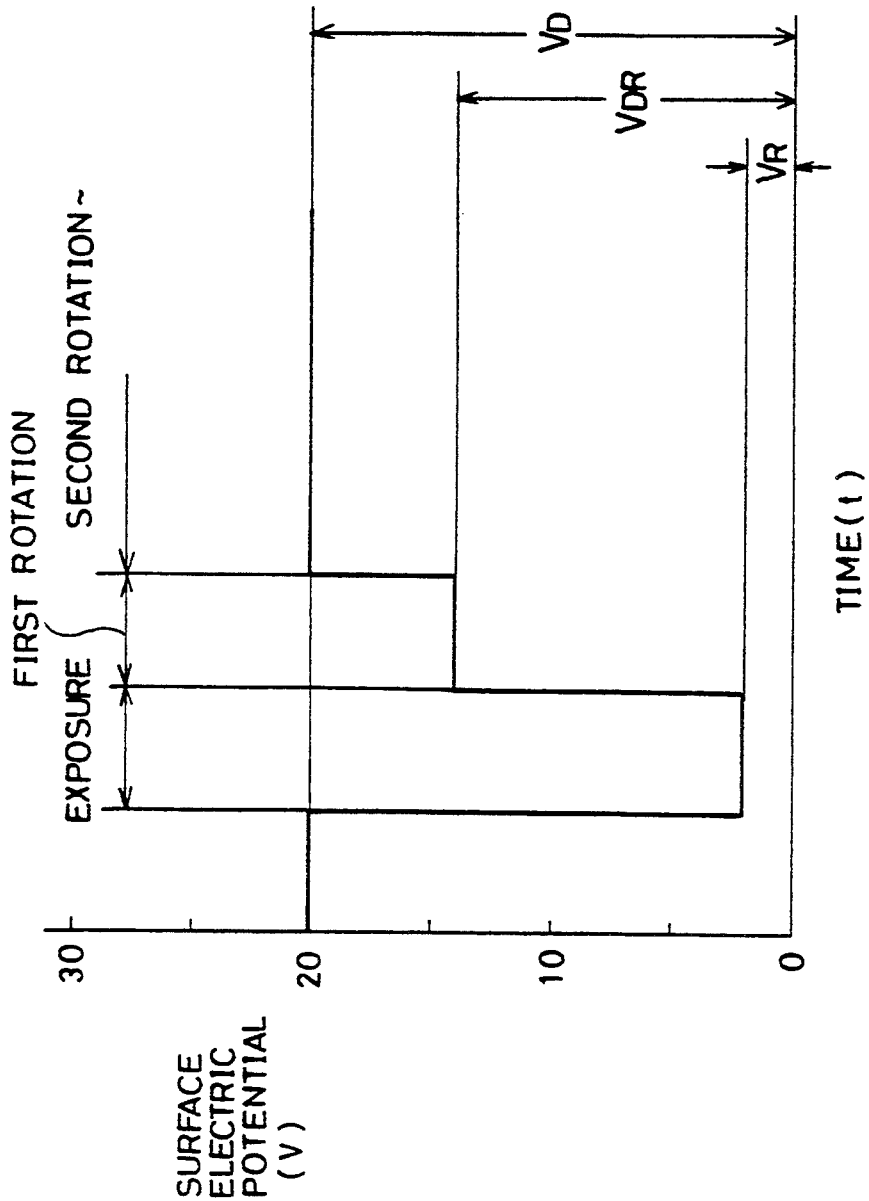

As shown in FIG. 8, in a conventional electrophotographic printing machine wherein the dielectric layer 54 is formed on the photoreceptor 50, a charge derived from voltage that is applied to the magnet 56 is injected into the dielectric layer 54; therefore, the surface of the dielectric layer 54 is charged to have the same polarity as that of the magnet 56. For this reason, since the electric field that is exerted between the surface of the dielectric layer 54 and the magnet 56 becomes weaker, the charge is not sufficiently injected into the electrically conductive and magnetic toner 55 that corresponds to an exposed portion. This results in such a drawback that it becomes difficult to make the electrically conductive toner 55 adhere to the surface of the photoreceptor 50. However, as shown in FIGS. 4 through 6, in the present embodiment wherein the photoreceptor drum 1 is provided with the transparent cylindrical base 1a having the transparent electrically conductive layer 1b and the photoconductive layer 1c formed thereon, since no dielectric layer is provided on the surface of the photoreceptor drum 1, the above-mentioned drawback can be eliminated.

Additionally, as for the electrophotographic printing machine of the present invention wherein the electric potential difference between the saturation value $V_D$ of the surface electric potential of the photoreceptor drum 1 and the surface electric potential $V_L$ of the photoreceptor drum 1 after exposure is smaller than that of the prior art system, it might be considered that the density of solid portions of an image may become too low. However, when measurements of the density of the solid portions of an image are conducted using a reflection densitometer, a value of 1.3 is obtained. Therefore, it has been found that the lowering of the image density is not caused by the reduction of the electric potential difference between the saturation value $V_D$ and the surface electric potential $V_L$ after exposure.

Moreover, in the present embodiment, the explanation has been given of a case wherein the electrically conductive toner T is used as a developer and the toner holder 5 constituted by the magnetic roller 5a and the developer sleeve 5b is employed as a developer holding means; yet, if a system which permits an electrically conductive developer holding means to directly contact the photoreceptor drum 1 is adopted, it is possible to use dielectric toner as a developer. In the case where the dielectric toner is used as a developer, an elastic member having electrical conductivity or a fur brush roller having electrical conductivity is preferably employed as the developer holding means. Further, in the case where the dielectric toner is used as a developer, the developer holding means is preferably constituted of a non-magnetic sleeve, a magnetic force generating means installed inside the non-magnetic sleeve and electrically conductive and magnetic powder that is held on the surface of the non-magnetic sleeve by the magnetic force of the magnetic force generating means.

In addition, in the present embodiment, the photoreceptor drum 1 which is constituted of a transparent cylindrical base 1a having a transparent electrically conductive layer 1b and a photoconductive layer 1c laminated in this order on the surface thereof, is employed as a photoreceptor means whereon visible images are formed; yet, the present invention is not intended to be limited to this structure. In particular, in order to improve the charge holding characteristic of the surface of the photoreceptor means, a photoreceptor means having a blocking layer provided between the photoconductive layer and the transparent electrically conductive layer is preferably employed.

As described above, the electrophotographic printing machine of the present invention is provided with: photoreceptor means having a photoconductive layer formed thereon, the photoconductive layer being moved in relation to charging develop means; charging develop means for charging a surface of the photoreceptor means by applying a voltage thereto and for conducting a developing process by supplying a developer onto the surface of the photoreceptor means; and exposure means for exposing the photoconductive layer in such a manner that a surface voltage of the photoreceptor means is lowered. Further, in the electrophotographic printing machine, the exposure means is set in such a manner that an exposing energy thereof is represented by an equation:

$$V_L \geqslant V_D - V_{D1},$$

where $V_{D1}$ designates the surface electric potential of the photoreceptor means that is exerted when the surface of the photoreceptor means, originally having a surface electric potential of virtually zero V, passes by the charging develop means; $V_D$ designates the saturation value of the surface electric potential of the photoreceptor means that is attained after the surface of the photoreceptor means has successively passed by the charging develop means; and $V_L$ designates the lowered surface electric potential of the photoreceptor means that is to be reached by an exposure.

With the above arrangement, it is not necessary to provide a charger such as a corona discharger which produces unwanted ozone during the charging process. Further, the surface electric potential $V_L$ of the photoreceptor, which has been lowered by the previous exposure, is increased to the vicinity of the saturation value $V_D$ of the surface electric potential of the photoreceptor through the charge applied by the charging develop means during the following developing process. For this reason, the electrostatic latent image derived from the previous image pattern hardly remains at a non-image portion of the surface of the photoreceptor means. Therefore, good images without being affected by residual images can be obtained in the above-mentioned electrophotographic printing machine.

While this invention has been disclosed in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. An electrophotographic printing machine comprising:
   photoreceptor means including a transparent base having a transparent electrically conductive layer laminated thereon and a photoconductive layer laminated on said electrically conductive layer, the photoconductive layer being moved relative to developer holding means;
   developer holding means for holding an electrically conductive developer and applying the electrically conductive developer in contact with the photoreceptor means, the developer holding means being electrically conductive;
   voltage application means for applying voltage across the developer holding means and the transparent electrically conductive layer; and
   exposure means for exposing the photoconductive layer so that a surface voltage of the photoreceptor means is lowered by exposing a portion in contact with the developer through the transparent base and the transparent electrically conductive layer from a side of the transparent base,
   wherein in forming an image corresponding to an exposure pattern on the surface of the photoreceptor means, charging and developing processes are carried out almost at the same time by conducting an exposing process corresponding to an image by the exposure means while charging the surface of the photoreceptor means by applying a voltage across the developer holding means and the transparent electrically conductive layer, and
   the exposure means is set in such a manner that an exposing energy thereof is represented by an equation:

$$V_L \geqslant V_D - V_{D1},$$

where $V_{D1}$ designates the surface electric potential of the photoreceptor means that is exerted when the surface of the photoreceptor means, originally having a surface electric potential of virtually zero V, passes by a portion in which the charging and developing processes are carried out; $V_D$ designates the saturation value of the surface electric potential of the photoreceptor means that is attained after the surface of the photoreceptor means has successfully passed by the portion; and $V_L$ designates the lowered surface electric potential of the photoreceptor means that is to be reached by an exposure.

2. The electrophotographic printing machine as set forth in claim 1, wherein;
   said photoreceptor means is a cylindrical photoreceptor drum.

3. The electrophotographic printing machine as set forth in claim 2, wherein:
   the transparent electrically conductive layer is a $In_2O_3$ layer with a thickness of approximately 0.5 μm.

4. The electrophotographic printing machine as set forth in claim 2, wherein:
   the transparent electrically conductive layer is a $SnO_2$ layer.

5. The electrophotographic printing machine as set forth in claim 2, wherein:
   the photoconductive layer is an amorphous Si layer with a thickness of approximately 3 μm.

6. The electrophotographic printing machine as set forth in claim 2, wherein:

the photoconductive layer is an Se layer.

7. The electrophotographic printing machine as set forth in claim 2, wherein:
the photoconductive layer is a ZnO layer.

8. The electrophotographic printing machine as set forth in claim 2, wherein:
the photoconductive layer is a CdS layer.

9. The electrophotographic printing machine as set forth in claim 2, wherein:
the exposure means, which is installed inside the photoreceptor drum, exposes the photoconductive layer by applying a light thereonto through the transparent base and the transparent electrically conductive layer.

10. The electrophotographic printing machine as set forth in claim 1, wherein:
said exposure means includes a light emitting diode (LED) array wherein a plurality of lens having a short focal distance and LEDs are combined.

11. The electrophotographic printing machine as set forth in claim 1, wherein:
said developer is an electrically conductive and magnetic toner; and said developer holding means comprises a non-magnetic sleeve and magnetic force generating means installed inside the non-magnetic sleeve.

12. The electrophotographic printing machine as set forth in claim 11, wherein;
the magnetic force generating means comprises a magnetic roller including N polarity magnets and S polarity magnets that are alternately disposed in a circumferential direction;

13. An electrophotographic printing machine comprising:
photoreceptor means including a transparent base having a transparent electrically conductive layer laminated thereon and a photoconductive layer laminated on said electrically conductive layer, the photoconductive layer being moved relative to developer holding means;
developer holding means for holding a dielectric developer and applying the dielectric developer in contact with the photoconductive layer, the developer holding means being in contact with the photoreceptor means, the developer holding means being electrically conductive; and
voltage application means for applying voltage across the developer holding means and the transparent electrically conductive layer,
wherein in forming an image corresponding to an exposure pattern on the surface of the photoreceptor means, charging and developing processes are carried out almost at the same time by conducting an exposing process corresponding to an image by the exposure means while charging the surface of the photoreceptor means by applying a voltage across the developer holding means and the transparent electrically conductive layer, and
the exposure means is set in such a manner that an exposing energy thereof is represented by an equation:

$$V_L > V_D - V_{D1},$$

where $V_{D1}$ designates the surface electric potential of the photoreceptor means that is exerted when the surface of the photoreceptor means, originally having a surface electric potential of virtually zero V, passes by a portion in which the charging and developing processes are carried out; $V_D$ designates the saturation value of the surface electric potential of the photoreceptor means that is attained after the surface of the photoreceptor means has successfully passed by the portion; and $V_L$ designates the lowered surface electric potential of the photoreceptor means that is to be reached by an exposure.

14. The electrophotographic printing machine as set forth in claim 13, wherein:
the developer is a dielectric toner; and the developer holding means comprises a fur brush roller.

15. The electrophotographic printing machine as set forth in claim 13, wherein:
the developer is a dielectric toner; and
the developer holding means comprises a non-magnetic sleeve; magnetic force generating means installed inside the non-magnetic sleeve; and electrically conductive and magnetic powder held on the surface of the non-magnetic sleeve by a magnetic force that is exerted by the magnetic force generating means.

16. The electrophotographic printing machine as set forth in claim 13, wherein:
the developer is a dielectric toner; and
the developer holding means is constituted of an elastic member.

17. The electrophotographic printing machine as set forth in claim 1, further comprising:
moving means which moves in contact with the surface of the photoreceptor means, with at least one surface in contact with the photoreceptor means being dielectric;
transfer means for transferring the visible image formed on the photoconductive layer of the photoreceptor means to the moving means; and
melt transfer fixing means for melting developer of the visible image that has been transferred onto the moving means and further transferring the visible image onto a copying material to be permanently affixed thereto.

18. The electrophotographic printing machine as set forth in claim 17, wherein the melt transfer fixing means comprises:
pressing means being pressed towards a surface of the moving means so as to sandwich the copying material in between; and
heating means for melting the developer of the visible image formed on the surface of the moving means by heat treatment, the heating means being located in the vicinity of a contacting area between the pressing means and the moving means.

19. The electrophotographic printing machine as set forth in claim 18, wherein:
the pressing means includes a pressing roller rotating while pressing force is being applied towards the moving means.

20. The electrophotographic printing machine as set forth in claim 18, wherein:
the heating means is arranged so as to sandwich the moving means with the pressing means, the heating means including a plane-shaped electric heating element that is placed face to face with the moving means.

21. The electrophotographic printing machine as set forth in claim 20, wherein:
the plane-shaped electric heating element is a Mo series electric resistance heater.

22. The electrophotographic printing machine as set forth in claim 17, wherein:
the moving means is provided as an endless belt.

23. The electrophotographic printing machine as set forth in claim 17, wherein:
the transfer means includes a transfer roller for pressing the moving means towards the surface of the photoreceptor means; and
voltage is applied to the transfer roller with a polarity opposite to that of an electric charge of the visible image formed on the photosensitive layer.

24. The electrophotographic printing machine as set forth in claim 23, further comprising:
a tension roller being rotatively provided,
wherein the moving means goes around the transfer roller, the heating means and the tension roller.

25. The electrophotographic printing machine as set forth in claim 17, wherein:
the moving means is made of a film material including polyimide resin.

26. The electrophotographic printing machine as set forth in claim 17, wherein:
the moving means is a metal belt having at least one surface whereon a dielectric layer is formed, the one surface being in contact with the photoreceptor means.

27. The electrophotographic printing machine as set forth in claim 26, wherein:
the metal belt is an electric cast nickel belt; and
the dielectric layer is formed by coating a surface of the metal belt with fluorine contained resin.

28. The electrophotographic printing machine as set forth in claim 17, wherein:
the moving means has a thickness of substantially 10 m to 200 μm.

29. The electrophotographic printing machine as set forth in claim 1, wherein:
the photoreceptor means is constituted by the transparent base wherein the transparent electrically conductive layer, a blocking layer and a photoconductive layer are laminated in order on the transparent base.

30. An electrophotographic printing machine comprising:
a rotative photoreceptor drum having an optically transparent cylindrical base, an optically transparent electrically conductive layer and a photoconductive layer, the photoreceptor drum being constituted of the transparent cylindrical base whereon the transparent electrically conductive layer and the photoconductive layer are formed in this order;
a toner holder for holding an electrically conductive and magnetic toner by a magnetic force and applying the electrically conductive and magnetic toner to be in contact with the photoconductive layer;
a power supply for applying voltage across the electrically conductive and magnetic toner and the transparent electrically conductive layer;
exposure unit, installed inside the photoreceptor drum, for exposing the photoconductive layer at a contact portion to the the electrically conductive and magnetic toner by applying a light onto the photoconductive layer through the transparent base and the transparent electrically conductive layer;
a dielectric belt which moves in contact with the photoconductive layer of the photoreceptor drum, with at least one surface in contact with the photoconductive layer being dielectric;
a transfer roller for transferring a visible image formed on the photoconductive layer onto the dielectric belt while pressing the dielectric belt toward the photoconductive layer of the photoreceptor drum;
a heating device for melting the toner of the visible image that has transferred onto the dielectric belt by heat treatment; and
a pressing roller for pressing the superposed portion of the dielectric belt and a copying material toward the heating device, the pressing roller being placed face to face with the heating device,
wherein the exposure unit is set in such a manner that an exposing energy thereof is represented by an equation:

$$V_L \geqslant V_D - V_{D_1},$$

where $V_{D_1}$ designates the surface electric potential of the photoreceptor drum that is exerted when the surface of the photoreceptor drum, originally having a surface electric potential of virtually zero V, passes by the area in contact with the electrically conductive and magnetic toner; $V_D$ designates the saturation value of the surface electric potential of the photoreceptor drum that is attained after the surface of the photoreceptor drum has successively passed by the area in contact with the electrically conductive and magnetic toner; and $V_L$ designates the lowered surface electric potential of the photoreceptor drum that is to be reached by an exposure.

* * * * *